US006254330B1

(12) United States Patent
Steffen et al.

(10) Patent No.: US 6,254,330 B1
(45) Date of Patent: Jul. 3, 2001

(54) DRUM CHARGING SYSTEM

(75) Inventors: Nathan D. Steffen, Wayland; Neil R. Weaver, Portage, both of MI (US)

(73) Assignee: EHS Solutions, L.L.C., Portage, MI (US)

( * ) Notice: Subject to any disclaimer, the term of this patent is extended or adjusted under 35 U.S.C. 154(b) by 0 days.

(21) Appl. No.: 09/260,848

(22) Filed: Mar. 2, 1999

(51) Int. Cl.⁷ .................................................. B65G 65/23
(52) U.S. Cl. ...................... 414/421; 141/114; 141/285; 414/291; 414/420
(58) Field of Search ................................ 414/291, 292, 414/420, 421; 141/114, 285, 289, 391

(56) References Cited

U.S. PATENT DOCUMENTS

| 731,442 | 6/1903 | Elliott . | |
|---|---|---|---|
| 3,057,498 | 10/1962 | Wheat . | |
| 3,405,820 | 10/1968 | Mori . | |
| 3,985,245 | 10/1976 | Schulte . | |
| 4,095,707 | * 6/1978 | Kowtko | 414/421 X |
| 4,354,776 | * 10/1982 | Matsui | 414/420 X |
| 4,627,781 | 12/1986 | Borgner . | |
| 4,669,950 | * 6/1987 | St. Lawrence | 414/291 X |
| 4,744,701 | * 5/1988 | Chasteen | 414/421 X |
| 4,825,913 | * 5/1989 | Stott | 141/114 X |
| 4,966,311 | * 10/1990 | Taylor | 414/291 X |
| 5,205,699 | 4/1993 | Habicht . | |
| 5,248,429 | * 9/1993 | Larsen | 141/114 X |
| 5,275,662 | 1/1994 | Wendler et al. . | |
| 5,302,073 | 4/1994 | Riemersma et al. . | |
| 5,558,485 | 9/1996 | Haynes . | |
| 5,735,321 | * 4/1998 | Martyn et al. | 414/292 X |
| 5,947,333 | * 9/1999 | Hoffmann et al. | 414/291 X |

FOREIGN PATENT DOCUMENTS

| 54-8368 | * 1/1979 | (JP) | 414/291 |
|---|---|---|---|
| 61-124437 | * 6/1986 | (JP) | 414/420 |

OTHER PUBLICATIONS

Morse, Morse "Karriers" Equipment to Lift, Move, Stack, Weigh, and Pour, undated, two pages.
Palamatic Handling USA, Inc., The Palamatic Drum Lifter, undated, two pages.
Meto Corp., Drum and Container Handling Equipment for the Pharmaceutical Environment, undated, two pages, Allendale, New Jersey, USA.
Wedco, Inc., The Hydravator Hydraulic Drum Hoist, undated, two pages.

* cited by examiner

*Primary Examiner*—James W. Keenan
(74) *Attorney, Agent, or Firm*—Varnum, Riddering, Schmidt & Howlett LLP

(57) ABSTRACT

A drum charging system (100) is disclosed, for alleviating ergonomic concerns and chemical exposure hazards associated with the manual addition of solid materials from drums into processing equipment. The drum charging system (100) is adapted to be utilized with drum containers (102) having solid materials contained within a material bag (104). The system (100) comprises a ventilation sleeve (110) and a drum manipulator (200). The ventilation sleeve (110) captures dust which may be generated during the addition of solid materials from the drum (102) and material bag (104) into a reaction vessel (106). The drum manipulator (200) is adapted to be portable and facilitates manipulation of drums during charging functions.

1 Claim, 15 Drawing Sheets

DRUM CHARGING SYSTEM

This application claims the benefit of Provisional No. 60/076,469 filed Mar. 2, 1998.

BACKGROUND OF THE INVENTION

1. Field of the Invention

The present invention relates to the field of drum charging apparatus and, more particularly, apparatus for facilitating the transfer of materials within a drum or similar container into a reaction vat or other type of vessel.

2. Description of the Related Art

A number of industries involve operations which require the manual transfer of solid materials from transportable drums into processing equipment. Such activities are typically referred to as "the charging" of drums of materials into the process equipment. Such process equipment may comprise reaction vessels, tanks or other similar types of apparatus utilized to mix or otherwise process materials. These activities occur throughout commercial industry, but may be of particular concern in the pharmaceutical, chemical, cosmetic and food processing industries, where environmental and contaminant concerns are of a particularly high priority. For example, in the pharmaceutical and other chemical processing industries, potential hazards may exist with respect to chemical exposure and like dangers.

The drums which are utilized throughout these industries may be of a substantial weight. For example, in the pharmaceutical industry, drums comprising chemical materials may often weigh up to 80 kilograms. If employees attempt to manually manipulate such drums without the use of mechanical equipment to facilitate operations and otherwise provide mechanical assistance, such manual manipulation may often involve awkward "postures," thereby increasing risks of injury. Accordingly, drum charging clearly involves potential ergonomic hazards.

Another issue associated with drum charging systems, even those where substantial mechanical assistance may be provided, relates to the generation of air-transported particles in the form of dust and the like. Such dust may be readily generated within the work area when the materials are actually being transferred from the drum to the reaction vessel or similar container. Again, particularly within the pharmaceutical and other chemical industries, such dust may be highly toxic. Also, within any industry, the dust generated within the work area typically represents product loss. With expensive materials, the financial loss resulting from the dust generation may be significant.

Apparatus for facilitating the manipulation of drums during charging functions is known in the prior art. For example, the Habicht U.S. Pat. No. 5,205,699 issued Apr. 27, 1993 discloses a method and apparatus for lifting and tilting drums of flowable material. Referring specifically to the drawings and numerical references within the Habicht patent, a lifting and tilting apparatus 10 includes a base supported assembly 12, column assembly 14 and container support assembly 16. Contents of a receptacle 94 placed in the container support assembly 16 are dumped therefrom by vertical extension of the column assembly 14. The base support assembly 12 of the lifting and tilting apparatus 10 is relatively wide within respect to dimensions of the column assembly 14.

Habicht also generally discloses the concept of the use of a telescoping column attached to a base support. Interior of the column is a hydraulic cylinder to lift the sliding portion of the tubular column. As the sliding portion is lifted, the container support is lifted at twice the lift rate of the column. The container support is independently tilted at any convenient height between the lifting extent of the apparatus. The tilting of the container support is provided by an air-operated gear motor and carried on a moveable carriage. The moveable carriage and gear motor are fully contained interior of the telescoping column. A slot is provided in the column so as to allow the independent lifting and tilting of the container support by an operator.

In general, Habicht discloses a system comprising a lifting and tilting apparatus capable of being tilted independently of the lift. The system is considered useful with equipment having non-uniform receiving heights for their apertures, mouths, openings and the like which accept the material discharge from the receptacle. Accordingly, the Habicht patent is described as providing an apparatus capable of being utilized with a variety of processing equipment.

Another system is disclosed in the Haynes U.S. Pat. No. 5,558,485 issued Sep. 24, 1996. The Haynes patent discloses a lifting and dumping apparatus 10 in which a container 12 is lifted and dumped. The container 12 is pivotally attached to the lift and dump apparatus 10 by means of pivot pins 52. A hydraulic cylinder 56 tips the container 12, and dumps the contents therein when the hydraulic cylinder 56 is extended. The lift and dump apparatus 10 is stabilized by a pair of rearwardly extending base legs 40. In particular, the Haynes arrangement is described as providing an apparatus which can be manually maneuvered into position adjacent a conveyor belt, so that a worker can unload articles therefrom hydraulically onto the conveyor belt.

The Elliott U.S. Pat. No. 731,442 is an extremely early disclosure of a sack holder having a pivotable holder H. The holder H is normally disposed in a vertical orientation, but can be lifted and pivoted by grasping at handle z. The lifting and pivoting of holder H allows the contents of a sack resting therein to be emptied into a hopper c. The lift is manually powered and includes a base having feet m radiating so as to form a relatively broad base of support.

Another disclosure of a lifting and tilting mechanism is shown in the Wheat U.S. Pat. No. 3,057,498. The Wheat patent discloses a trash holder having a receptacle 50 automatically lifted and tilted to dump the contents therefrom. The receptacle 50 includes a closure member or lid 70 pivotally attached to the receptacle 50 at a hinge connection 72. Upon lifting and tilting the receptacle 50, gravity is utilized so as to rotate the closure member 70 downward, thereby opening the receptacle 50 and allowing the contents to be emptied. As the contents of the receptacle 50 are emptied, the closure member 70 apparently forces the contents to travel along the length of the member 70 before undertaking a "free fall" into a receiving structure.

Issues associated with dust removal have also been addressed in the prior art. For example, the Schulte U.S. Pat. No. 3,985,245 discloses an arrangement for charging the coal bins of hopper cars. The arrangement includes a weighing bunker 1 which extends in a downward direction as a tubular discharge connecting piece 2. The tubular discharge connecting piece 2 comprises a suction port 20 which removes dust generated by the dumping of the coal. The suction port 20 is connected to a tubular wall which forms an annular chamber for collection and removal of coal dust.

Correspondingly, the Borgner U.S. Pat. No. 4,627,781 discloses a bag cutting and emptying device 1 having a connected, collective dust removal filter. The device 1 includes a bag chute 8 connected to a transfer funnel 30, into which the contents of the bag are dumped. The bag chute 8 is provided with a pivotable flap 8.1, through which empty bags can be delivered to an empty bag compacting device 26. The device 1 includes a suction filter 32 disposed on its top, which serves to prevent dust from escaping into the working environment.

Another device is disclosed in the Mori U.S. Pat. No. 3,405,820. The Mori device comprises a hopper which is constructed with an absorption element 12 utilized to create an air curtain 9. The air curtain 9 serves to prevent dust from escaping into the outside environment. The air curtain 9 apparently comprises a flow of air in a single, linear direction.

A further device is disclosed in the Wendler U.S. Pat. No. 5,275,662. The Wendler, et al. patent discloses a flooring material applicator device 10 having a mixing chamber 20, which mixes material dumped therein from first and second component hoppers 22, 24, respectively. The first component hopper 22 is lifted and tilted by a hydraulic cylinder 76. The lifting action of the hydraulic cylinder 76 rotates the first component hopper 22 about an axis defined by hinges 74. A hydraulic cylinder 72 lifts the rear end of the second component hopper 24, so as to dump the contents therein into the chamber 20.

Another device is disclosed in the Riemersma U.S. Pat. No. 5,302,073. The Riemersma, et al. device comprises a lift and seal drum dumper for dumping the contents of a drum. Dumper 10 includes a hollow hood assembly 36 which fits over and above a drum D. The hollow hood assembly 36 includes a small diameter end 49, through which the contents of the drum D eventually exit. The drum D is tilted by means of a hydraulic cylinder 23.

Although prior art exists with respect to drum charging systems, the known prior art still does not address several significant problems. For example, production buildings in industries such as the pharmaceutical and chemical industries often have processing vessels located in relatively congested areas with limited head space. This head space is often limited because of low ceilings, significant and complex piping or other processing equipment. Drum dumping systems which are known and commercially available for use in such buildings are relatively large, heavy and difficult to maneuver within the limited space. In fact, these systems often counteract the weight of the drum with the weight of the drum manipulator. Also, known systems which may be utilized within various industries are often significantly expensive.

Other problems also exist with respect to known systems. For example, several drum dumping systems are often limited to serving only one vessel, and are therefore permanently installed within the industrial establishment. If the systems are installed in a manner such that they are permanently attached to the floor, such systems may take up valuable space when not needed, and are often relatively "bulky." Other systems may be attached overhead, such as to a rail system or the like. As earlier mentioned, and particularly in industries such as the pharmaceutical and chemical industries, overhead space may be required for relatively complex piping systems. Also, such overhead systems are also often limited to serving only one vessel. With respect to dust removal and similar types of ventilation systems, the inventors believe that the prior art is relatively limited. For example, the use of ventilation sleeves appears to comprise sleeves which ventilate only part of an opening. Also, the inventors understand that such sleeves may not have disposal ports for bags comprising toxic or other contaminant materials.

In view of all of the foregoing, there is a need for a drum charging system which is relatively economical, lightweight, portable, small and capable of serving multiple vessels. Also, it would be advantageous for such a system to be relatively low with regard to labor intensity, requiring a minimal number of operators while still charging drums relatively quickly. Finally, it would also be advantageous for such a system to operate in conjunction with a dust containment system.

SUMMARY OF THE INVENTION

Advantageously, a technical advance is achieved with a drum charging system utilized to facilitate lifting and dumping of the contents of drums into a reaction vessel or the like. The drum charging system includes a lift for lifting a drum from a standing position and dumping the contents of the drum. The system also comprises a loading sleeve which fits into the reaction vessel opening into which the drum contents are dumped.

The lift involves use of a post which may be inserted into the floor, so as to stabilize the lift with a minimum use of floor space. In addition, a sliding tray may be provided, so as to allow the lift to be used an extended distance away from the reaction vessel aperture, such as when obstacles or the like prevent close placement. In addition, the charging system may comprise a single, pivotable arm which extends generally no higher than the drum itself, and therefore does not require extensive overhead space.

The loading sleeve for the vessel aperture includes an arrangement so as to provide a radially outward and 360 degree configuration of air flow in the ventilation system in the loading sleeve, thereby providing improved dust retention. In addition, a funnel side port of the loading sleeve allows for disposal of drum bags, with minimal escapage of dust. In this manner, the drum charging system in accordance with the invention provides a system which is economical in both space and cost, and which provides improved dust containment.

BRIEF DESCRIPTION OF THE DRAWINGS

FIG. 15 illustrates the ventilation slot of the ventilation sleeve;

FIG. 16 illustrates the disposal port of the ventilation sleeve;

DETAILED DESCRIPTION OF THE PREFERRED EMBODIMENTS

The principles of the invention are disclosed, by way of example, in a drum charging system 100 primarily illustrated in FIGS. 1–24. The drum charging system 100 addresses and helps to alleviate ergonomic concerns and chemical exposure hazards which may be associated with the manual addition of solid materials from drums into processing equipment. The drum charging system 100 provides a relatively economical, light weight and portable system which has the capability of servicing multiple reaction vessels. In addition, the drum charging system 100 in accordance with the invention comprises a dust containment system utilized to work with a drum manipulation arrangement.

Figure 13:
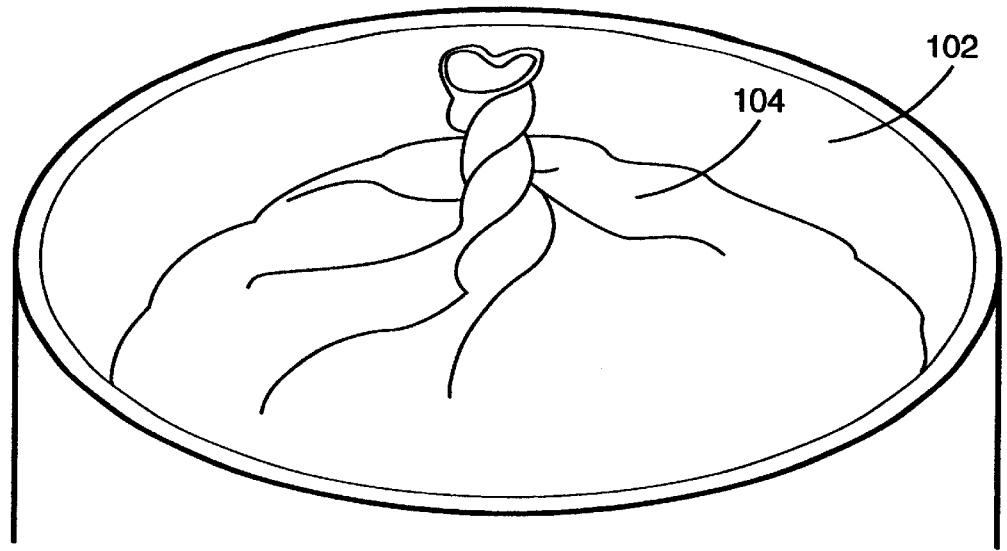
FIG. 13 illustrates a typical material bag within a drum which may be utilized with the drum charging system in accordance with the invention.
Figure 14:
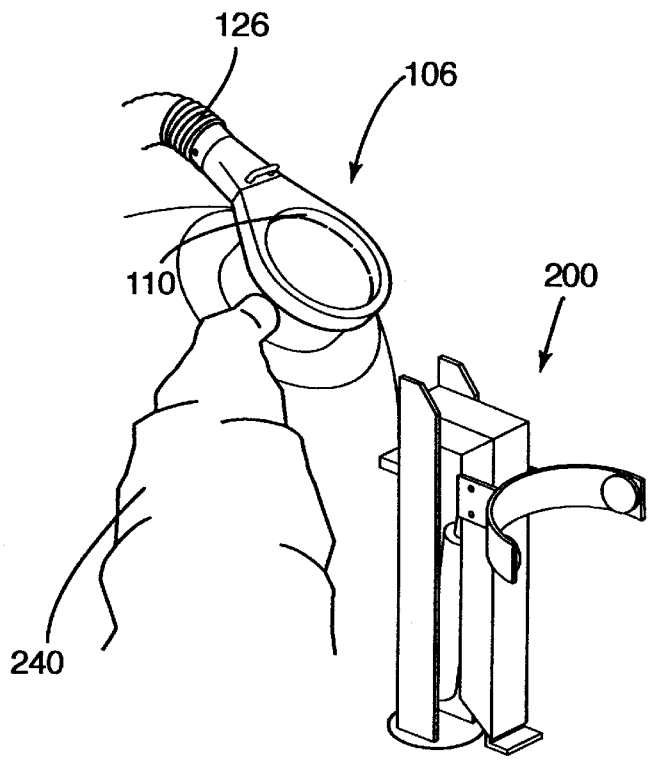
FIG. 14 illustrates the combination of the ventilation sleeve and the drum manipulator.
Figure 13:
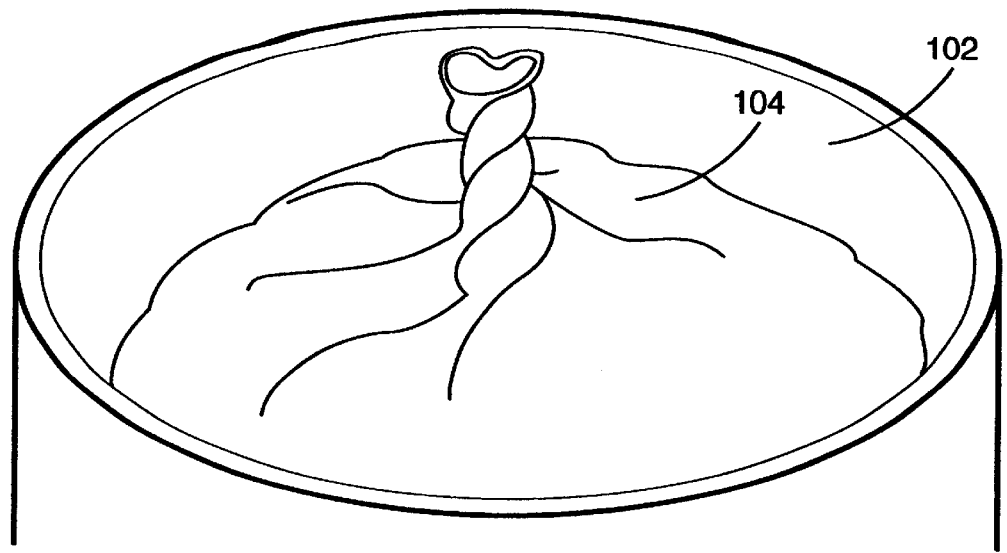
Figure 14:
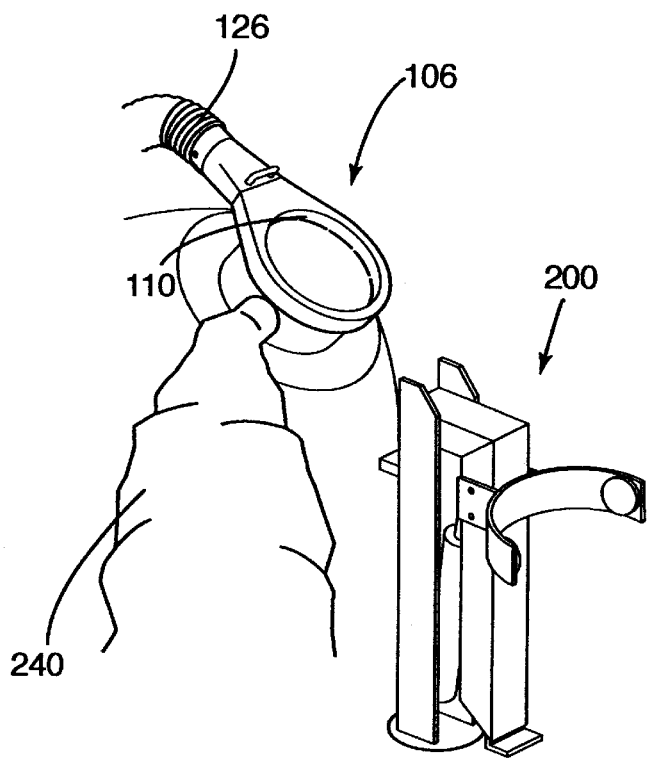

Again turning to the drawings, the drum charging system 100 is adapted to be utilized with containers such as the drum 102 shown in FIG. 13. However, a drum charging system in accordance with the invention is not limited to any particular shape or configuration of the drum containers. Accordingly, any of numerous shapes and configurations of drum containers may be utilized without departing from the novel concepts of the invention. As also shown in FIG. 13, the container drum 102 may actually have its solid material contained within a typical material bag 104. Such material bags are almost always used when the materials to be transported are toxic or otherwise must remain free of contaminants.

The drum charging system 100 may be described with respect to two primary components. More specifically, these components comprise a ventilation sleeve 110 as illustrated in perspective view in FIG. 22, and a drum manipulator 200, also shown in perspective view in FIG. 19. The combination of the ventilation sleeve 110 with a reaction vessel 106, and with a drum manipulator 200 is further shown in perspective view in FIG. 14.

Figure 1:
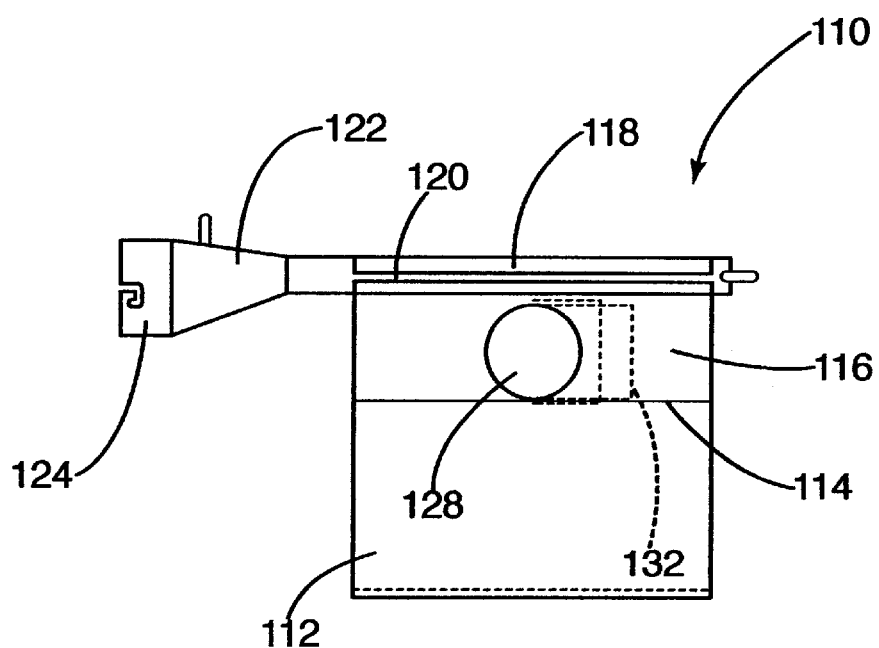
FIG. 1 is a sectional view of a ventilation sleeve in accordance with the invention, taken along lines 1—1 of FIG. 2.
Figure 2:
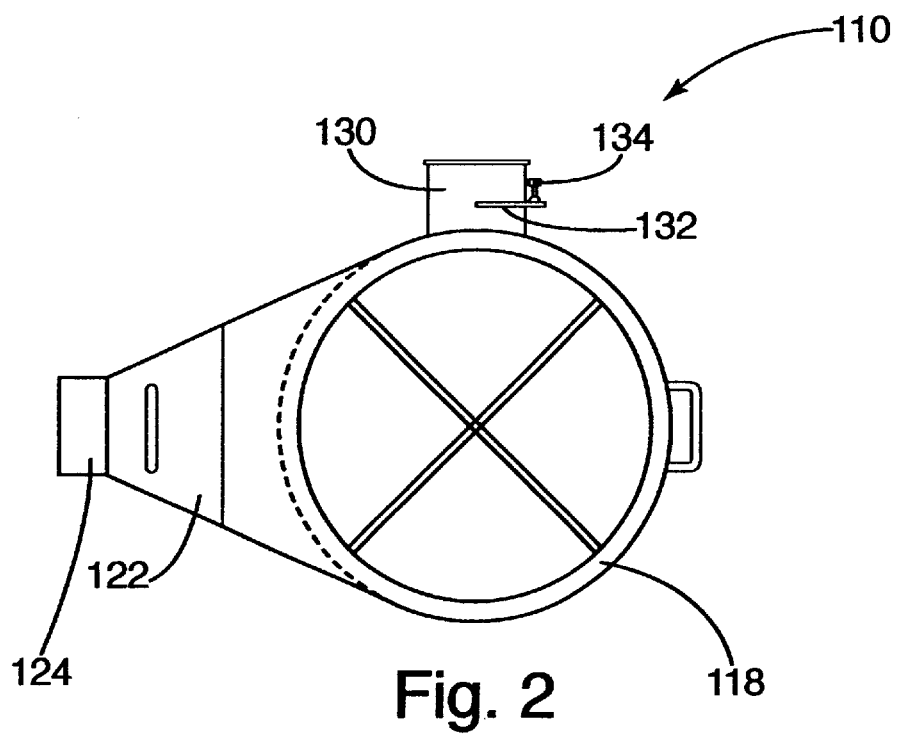
FIG. 2 is a plan view of a ventilation sleeve in accordance with the invention.

Turning specifically to the ventilation sleeve 110, the principle purpose of the ventilation sleeve 110 is to capture dust which may be generated during the addition of solid materials from the drum 102 and bag 104 into the reaction vessel 106. Turning specifically to FIGS. 1 and 2, the ventilation sleeve 110 includes a lower casing 112. The casing 112 is annular in structure and is adapted to be received within a corresponding aperture within the reaction vessel 106. The lower casing 112 is fitted within the reaction vessel 106 so that a stop ring 114 extending around the perimeter of the sleeve 110 appropriately positions the lower casing 112 of the sleeve 110 within the aperture of the reaction vessel 106.

The ventilation sleeve 110 also includes an upper casing 116 which may be integral with the lower casing 112. A collar 118 is fitted around the upper portion of the upper casing 116 so as to form a ventilation slot 120. The ventilation slot 120 extends around the entirety of the perimeter of the upper casing 116 within the collar 118. The ventilation slot 120 is contiguous with a dust collection chamber 122, as primarily shown in FIGS. 1 and 2. The dust collection chamber 122 includes, at its outer end, a connecting collar 124 which is adapted to receive a conventional exhaust hose or the like (not shown in FIGS. 1 and 2). For example, an exhaust hose such as the exhaust hose 126 illustrated in FIG. 14 may be utilized. With the exhaust hose 126 connected to a conventional exhaust system, an exhaust stream of air will be generated around the entire perimeter of the ventilation sleeve 110 through the ventilation slot 120. Although air flow speed and volume may not be entirely uniform around the entirety of the ventilation slot 120, the slot 120 may be characterized as providing for an exhaust stream of air which flows radially outward from the interior of the ventilation sleeve 110 at the plane of the ventilation slot 120.

The ventilation slot 120 formed in accordance with the foregoing operates so as to prevent dust from escaping from the reaction vessel 106 and the ventilation sleeve 110 during the charging operation. It should be noted that previously known ventilation slots would typically provide for a ventilation stream of air only throughout 180 degrees or less of the opening into the reaction vessel. However, during charging operations, the bag 104 from the drum 102 may, in fact, be partially drawn into the reaction vessel 106 and sleeve 110. Accordingly, bags 104 may block the exhaust flow of air within certain spacial areas of the sleeve 110. With prior art systems which did not utilize a full 360 degree perimeter ventilation slot, such as the ventilation slot 120, this blockage of air flow could result in allowing dust or other similar particles to escape within certain spacial areas of the interior of the sleeve or reaction vessel, dependant upon where air flow blockage was occurring.

The ventilation sleeve 110 also includes a disposal port aperture 128. The aperture 128 opens into a bag removal sleeve 130 which is adapted to receive collection bags 240 to be utilized for disposal of material bags 104 as described in subsequent paragraphs herein. The bag removal sleeve 130 may include a closure valve 132 having a thumb screw 134 connected thereto. The closure valve 132 is typically referred to as a "guillotine slide valve," and is utilized to provide closure of the disposal port aperture 128 when not in use.

In addition to the ventilation sleeve 110, the drum charging system 100 includes the drum manipulator 200 which is primarily shown in FIGS. 3, 4, 14, 19 and 20. With reference to these drawings, the drum manipulator 200 is adapted to be portable and moved where necessary through the use of a transport cart 202 primarily shown in FIGS. 3 and 4. The transport cart 202 includes a series of casters 204 for readily moving the transport cart 202 and supported drum manipulator 200 among locations adjacent reaction vessels 106. The drum manipulator 200 includes a pedestal support post 206 which is supported on the transport cart 202 through the use of a sleeve 208. Within the floor surface 210 adjacent each of the reaction vessels 106 is a pedestal support sleeve 212 which is embedded within the floor surface 210. The pedestal support post 206 on the drum manipulator 200 is adapted to be received within the pedestal support sleeve 212 located at the front of the reaction vessel into which the appropriate drum contents are to be transferred. The support posts 206 may be received within a corresponding support sleeve 212 in any of various appropriate arrangements.

Figure 3:
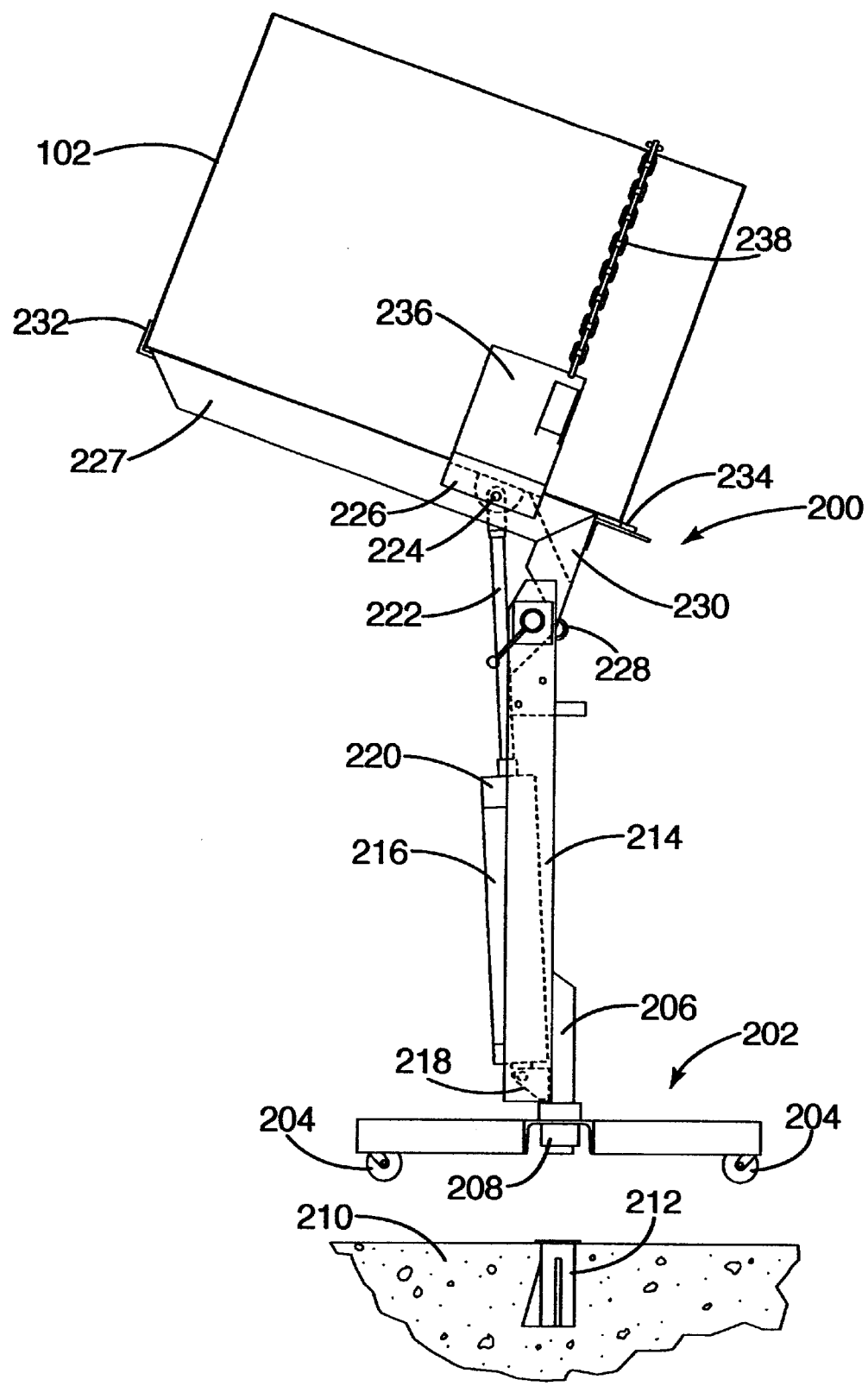
FIG. 3 is a side elevational view of the drum manipulator portion of the drum charging system in accordance with the invention.
Figure 4:
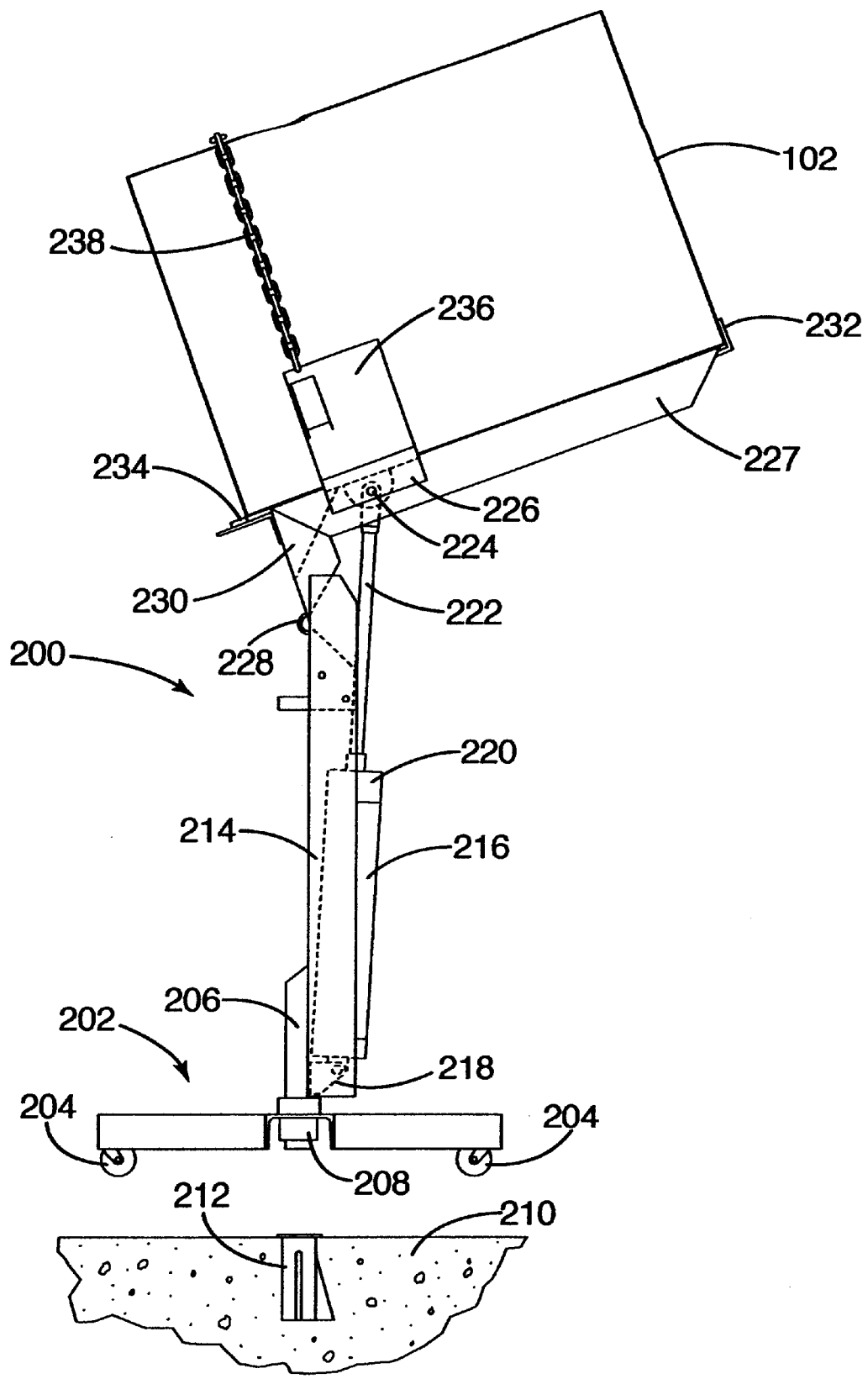
FIG. 4 is an opposing side elevation view of the drum manipulator portion of the drum charging system of FIG. 3.

Continuing to refer to FIGS. 3 and 4, the drum manipulator 200 includes a stationary frame 214. Mounted to the lower portion of the stationary frame 214 is one end of a pneumatic cylinder 216. The pneumatic cylinder 216 is connected to the frame 214 at a lower connection point 218. The opposing end 220 of the pneumatic cylinder 216 includes a cylinder piston 222. The distal end of the cylinder piston 222 is pivotably connected at pivot location 224 to a mounting bracket 226.

As also primarily shown in FIGS. 3 and 4, at the upper end of the stationary frame 214 is positioned a pivot connection 228. The pivot connection 228 pivotably mounts a pivoting frame 230 to the stationary frame 214. It should be emphasized that the location of the pivoting frame 230 continues to remain below the drum 102 during the lifting and tilting operation. In this manner, the drum manipulator 200 facilitates use in areas with relatively minimal head space 227.

Again with reference to FIGS. 3 and 4, the supporting arrangement for the drum 102 includes a lower drum support lip 232 and an upper drum support lip 234. In addition, drum support plates 236 are mounted to the sides of the drum support frame and are utilized to secure the drum 102 with the use of a restraining chain 238. Also, the drum 102 is supported within a cradle 227.

In addition to the use of a restraining chain 238, other attachment methods may also be utilized. For example, a pneumatic "latch" may be utilized within the drum cradle 227 for purposes of more firmly securing the drum 102 to the cradle 227. Pneumatic latches for securing elements within carriage or cradle-like devices is known. For purposes of activating the pneumatic latch, a manual switch could be utilized. Alternatively, a pressure sensitive switch could be located in the cradle and automatically activated as the drum 102 is positioned within the cradle 227. Still further, air suction could also be utilized, with the use of single or dual suction cups located within the cradle and appropriately positioned so as to provide an air suction interconnection with the drum 102. Such suction cups can be powered by vacuum pumps in relatively well known structures.

In addition to the foregoing, another aspect of a drum manipulator 200 in accordance with the invention may comprise the use of a sliding tray or the like for purposes of maneuvering the drum 102. In the foregoing description with respect to FIGS. 3 and 4, the cradle 227 essentially remains stationary relatively to the drum 102. However, the drum 102 could be positioned on a sliding tray within or otherwise appropriately positioned on the cradle 227. With a sliding tray arrangement, the drum 102 could correspondingly move longitudinally along the cradle 227. A sliding tray arrangement in accordance with the invention may utilize either gravity or other types of means for purposes of moving the drum 102. For example, a pneumatic cylinder or similar device could be utilized for purposes of sliding the drum 102 along the sliding tray. Of primary importance is the combination of the sliding tray with the pivoting arm arrangement for the drum manipulator 200, as opposed to merely use of a sliding tray in and of itself.

Figure 23:
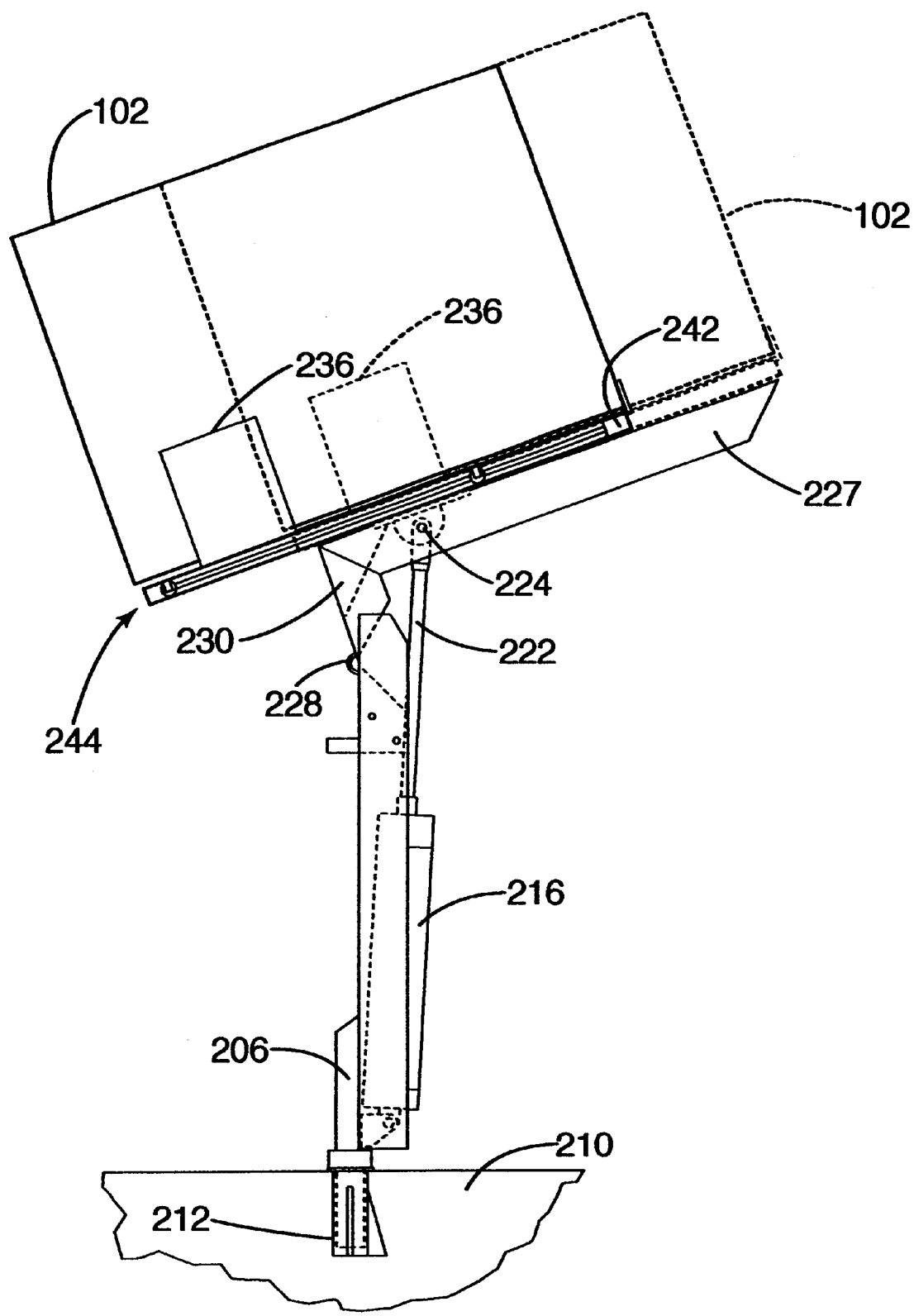
FIG. 23 is a view similar to FIG. 3, showing use of a sliding tray.

An example of the sliding tray concept is illustrated in FIG. 23. Therein, a sliding tray arrangement is illustrated which would utilize gravity for purposes of moving the drum 102. More specifically, the drum manipulator 200 shown in FIG. 23 includes a sliding tray 244 which is adapted to move or a track 242. In accordance with the configuration shown in FIG. 23, the drum 102, being maintained on the tray 244, which is mounted to the cradle 227, would move with gravity as the cylinder piston 222 exerts forces so as to pivot the drum 102 and cradle 227 about the pivot location 228.

Figure 24:
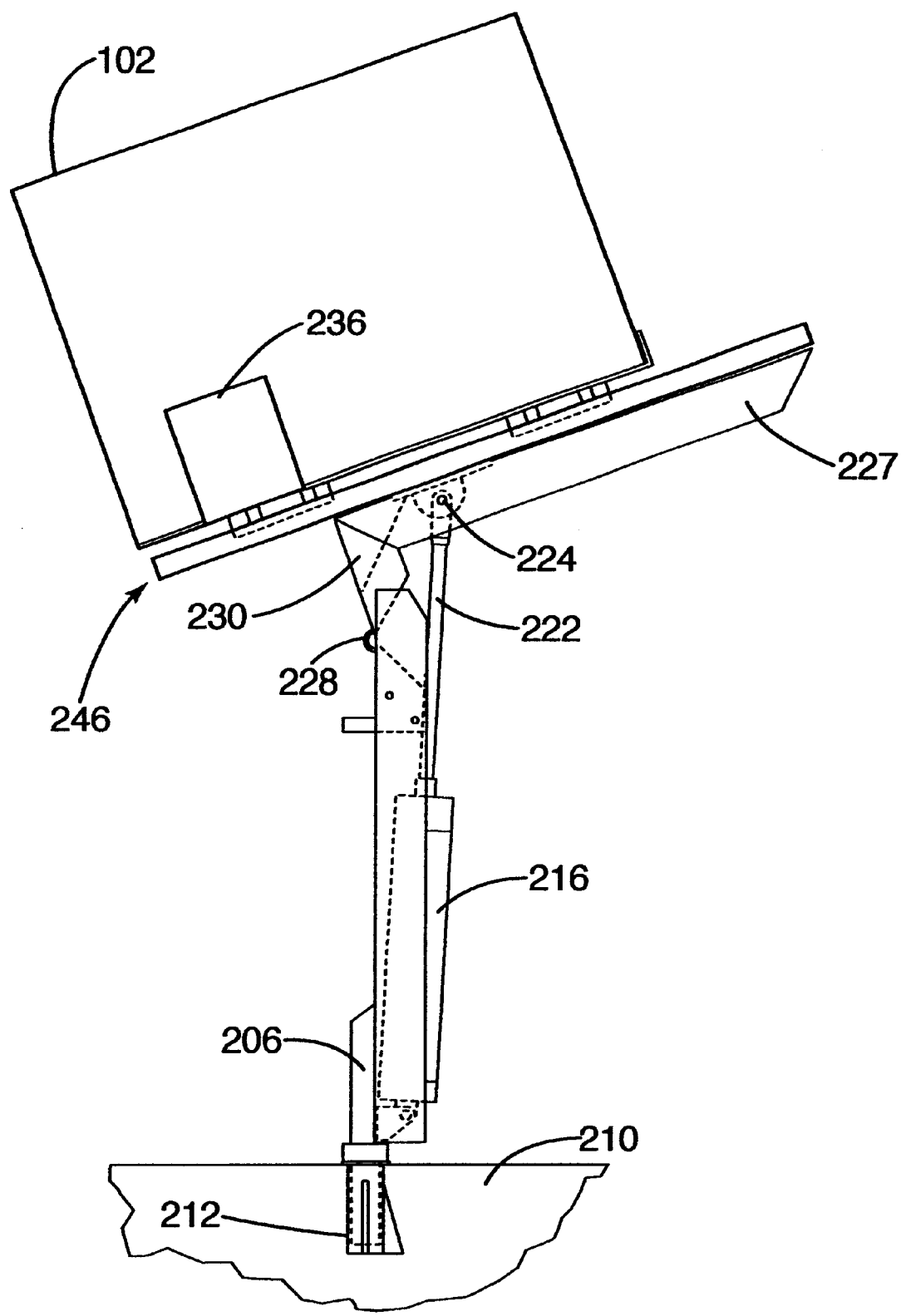
FIG. 24 is also similar to FIG. 3, showing a pneumatic cylinder sliding tray.

An arrangement employing a pneumatic cylinder is illustrated in FIG. 24 with respect to the sliding tray arrangement. As illustrated in FIG. 24, the sliding tray would utilize a rodless air cylinder 246 appropriately mounted to the cradle 227. The drum 102 would be associated with the air cylinder 246 in such a manner that the rodless air cylinder 246 would be able to move relative to the cradle 227. With the drum 102 supported appropriately with respect to the air cylinder 246, the drum would correspondingly move.

Although FIGS. 23 and 24 illustrate various examples of the sliding tray arrangement, other configurations could also be utilized in accordance with the invention.

The operation of the drum charging system 100 will now be described with respect to the drawings. In this regard, FIGS. 5–12 are not meant to show specific structure, but instead to show general functional steps undertaken during use of the system 100.

Figure 17:
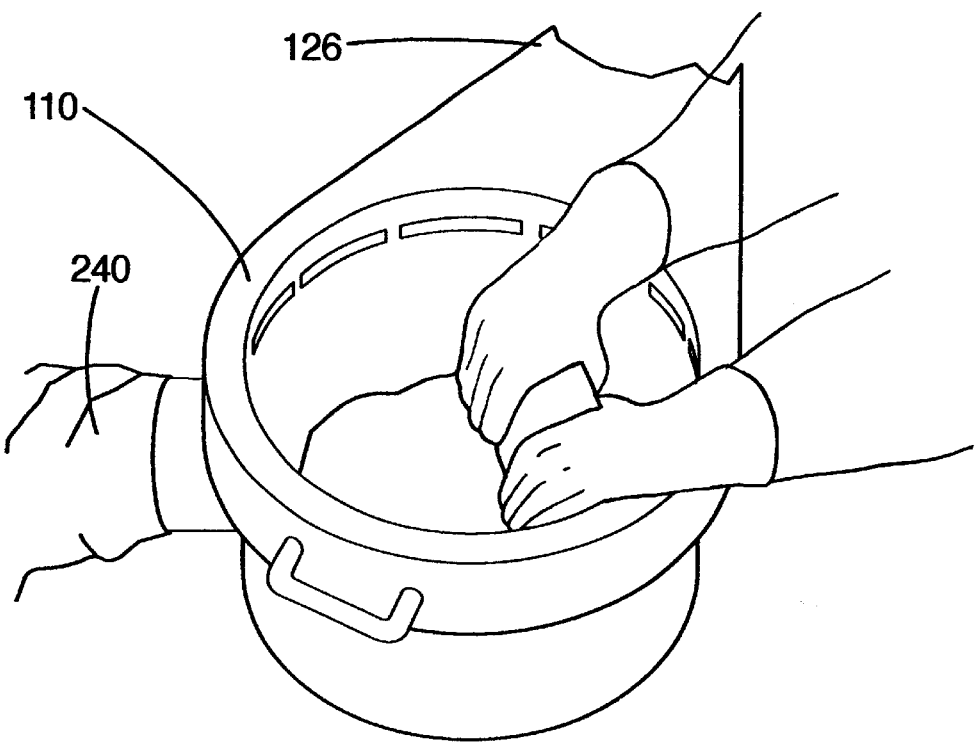
FIG. 17 illustrates a user rolling up an empty bag for purposes of disposal below the ventilation slot of the ventilation sleeve.
Figure 18:
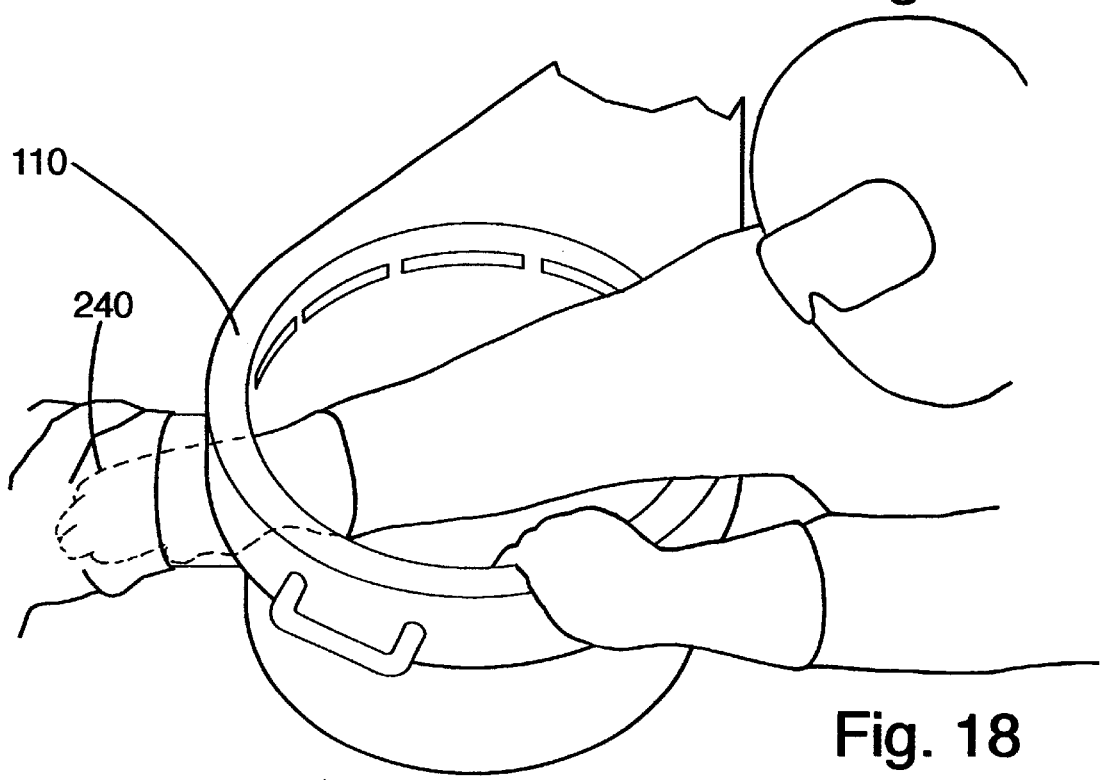
FIG. 18 illustrates a user disposing of an empty bag below the ventilation slot of the ventilation sleeve.
Figure 19:
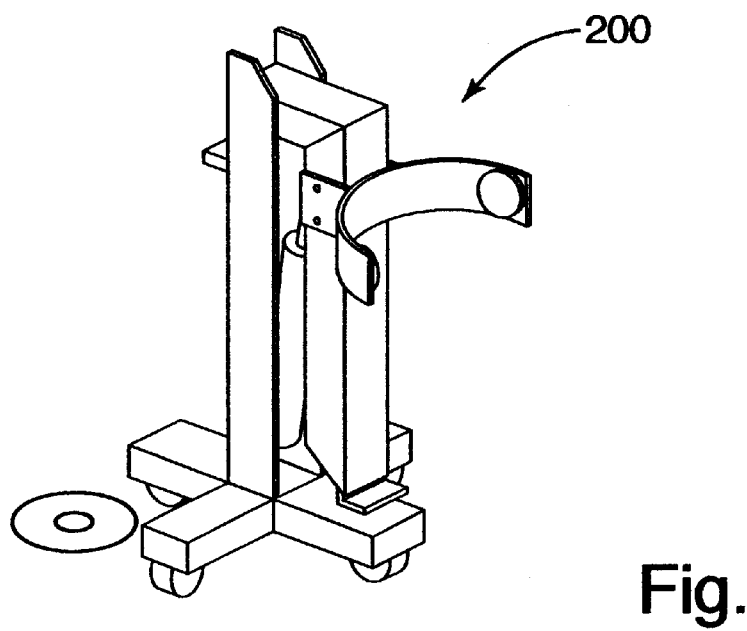
FIG. 19 is a general perspective view of the drum manipulator of the drum charging system in accordance with the invention.
Figure 20:
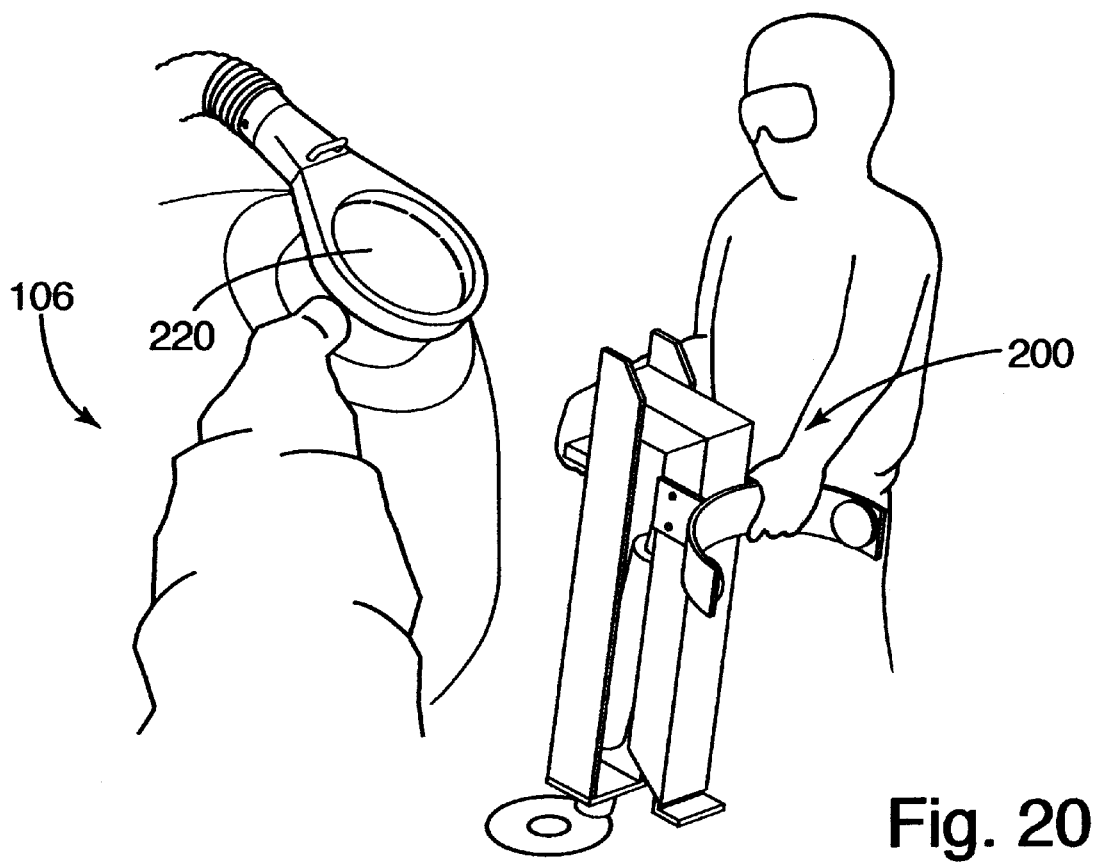
FIG. 20 illustrates the positioning of the drum manipulator into a steel receptacle within the front of a reaction vessel.
Figure 21:
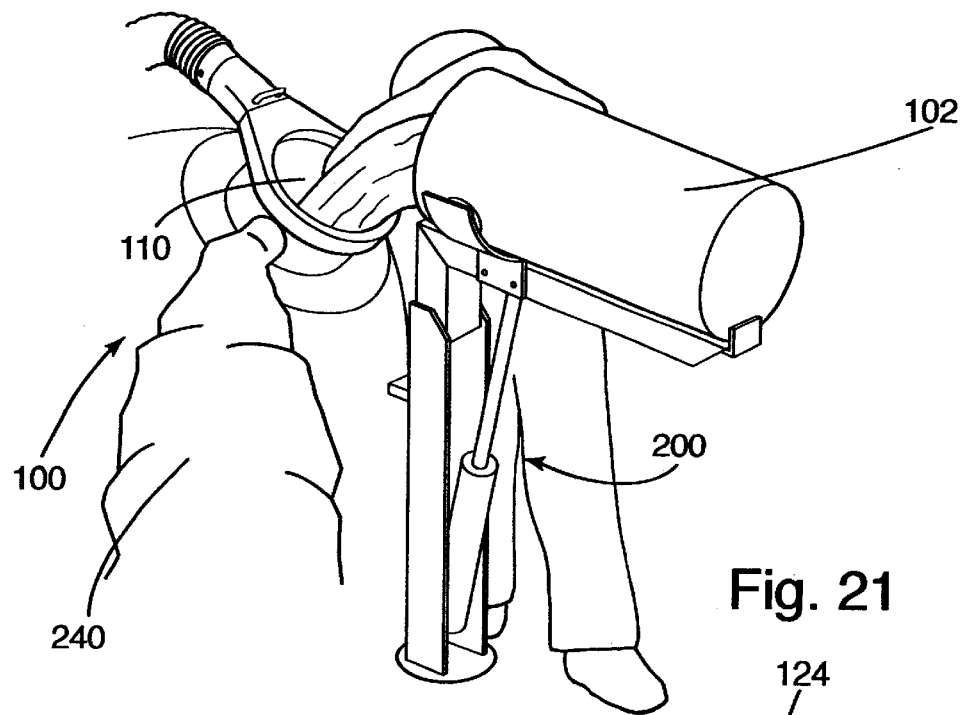
FIG. 21 illustrates a user in the process of transferring material from the drum to the reaction vessel utilizing the drum charging system in accordance with the invention.
Figure 22:
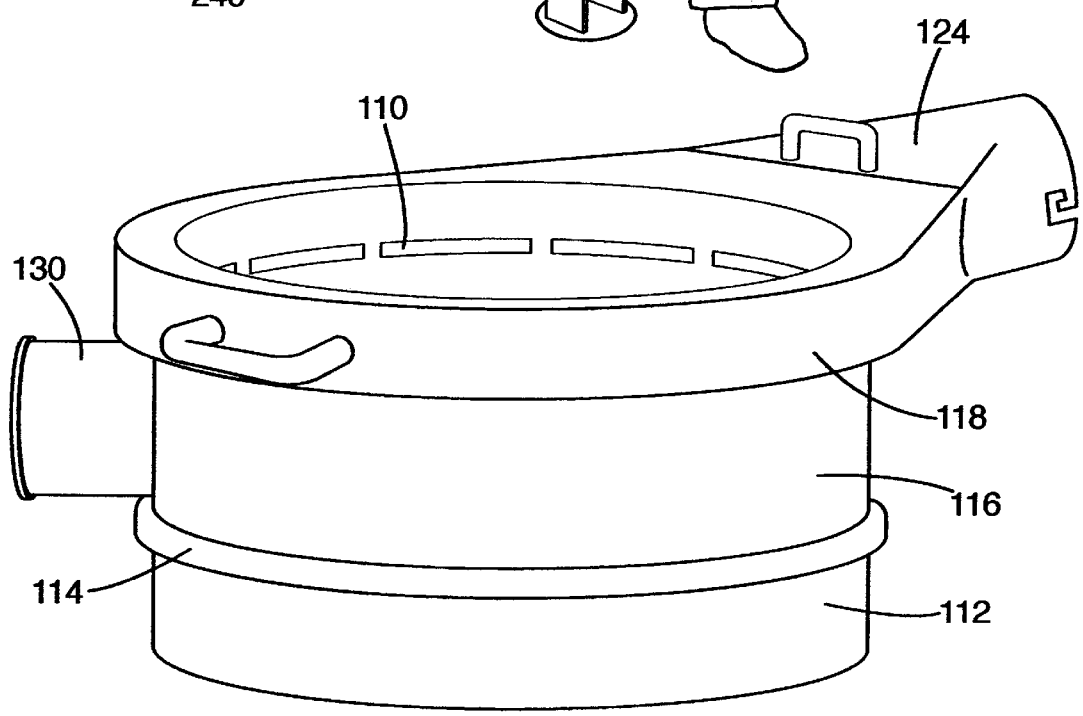
FIG. 22 illustrates the ventilation sleeve, separate and apart from the reaction vessel.

First, a collection bag 240 as shown in FIGS. 17 and 18 is attached to the bag removal sleeve 130 of the ventilation sleeve 110. The sleeve 110 is then placed into the opening of the reaction vessel 106 until the stop ring in 114 abuts the reaction vessel opening. The connecting collar 124 is then interconnected to an exhaust hose 126. The exhaust hose 126 is further connected to a local exhaust system for purposes of providing the exhaust air around the ventilation slot 120 of the sleeve 110.

The drum manipulator 200 is then moved into an appropriate position on the floor surface 210 so that the pedestal support post 206 may be received within the pedestal support sleeve 212 embedded within the floor surface 210. The particular sleeve 212 utilized is that which is located in the front of the reaction vessel 106 to which the drum material is to be transferred.

The drum 102 comprising the solid material within the bag 104 is then mounted to the cradle 227, with the cradle 227 positioned in its lowermost position at the lowermost portion of the drum manipulator 200. The drum 102 is secured to the cradle 227 through the use of the restraining chain 238. Alternatively or additionally, the drum 102 may be secured to the cradle 227 through the use of a pneumatic latch or dual suction cups.

Following appropriate positioning of the drum 102, the pneumatic cylinder 216 is then activated, causing the cylinder piston 222 to extend substantially upwardly. The drum cradle 227 then pivots about the pivot location 228 through the pivoting frame 230. In this manner, the drum 102 is inverted into a position as shown in FIGS. 2 and 3.

The operator then may place the end of the bag 104 within the drum 102 below the ventilation slot 120 of the ventilation sleeve 110. The positioning of the bag below the ventilation slot 120 is of primary importance, since it is the air flow at the horizontal plane of the ventilation slot 120 which will prevent dust from rising there- above as a result of manipulation activities occurring below the slot 120.

The operator may then allow the solid material from the bag 104 to flow from the opening of the bag 104 into the reaction vessel 106. Following completion of this operation, the cylinder 216 may then again be activated, so as to retract the cylinder piston 222 into the cylinder 216. In this manner, the drum 102 is lowered to its initial position.

Thereafter, for purposes of ensuring that contaminants are not released out of the ventilation sleeve 110, the operator will roll up the empty bag 104 while maintaining the entirety of the bag 104 below the ventilation slot 120. The empty bag 104 may then be discarded through the disposal port aperture 128 and bag removal sleeve 130 into the collection bag 240.

Figure 5A:
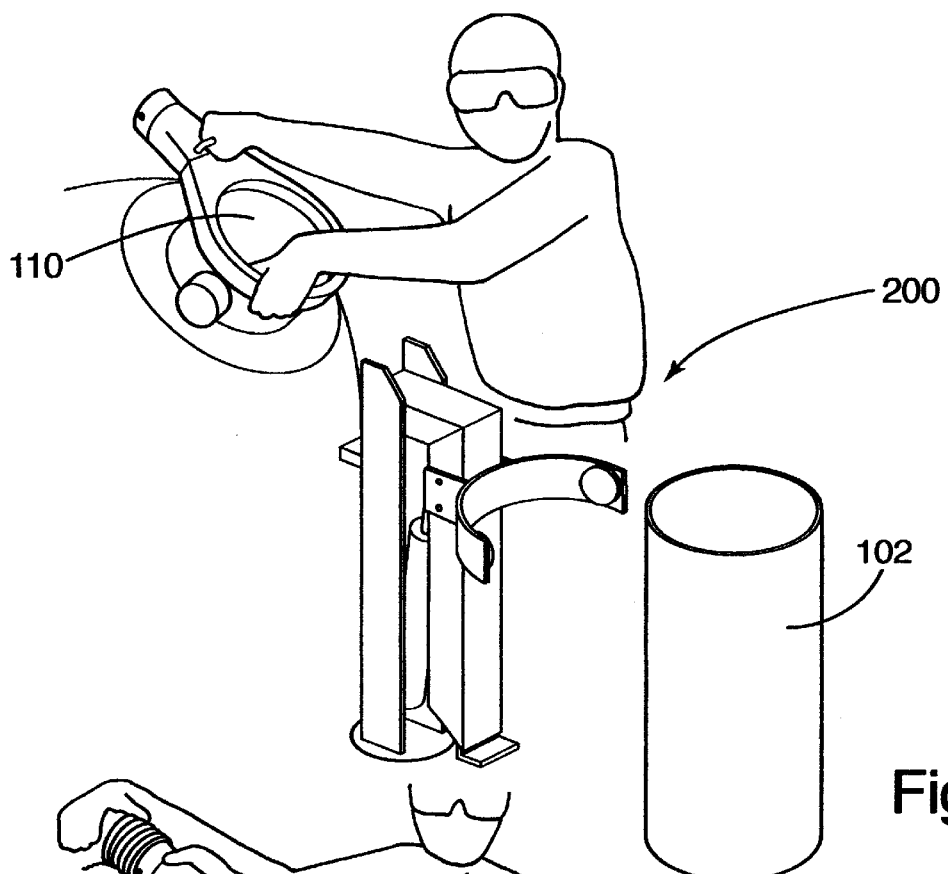
FIGS. 5A, 5B, 5C and 6–12 are simplified illustrations of functional steps utilized in the process of drum manipulation during charging operations in accordance with the invention.
Figure 5B:
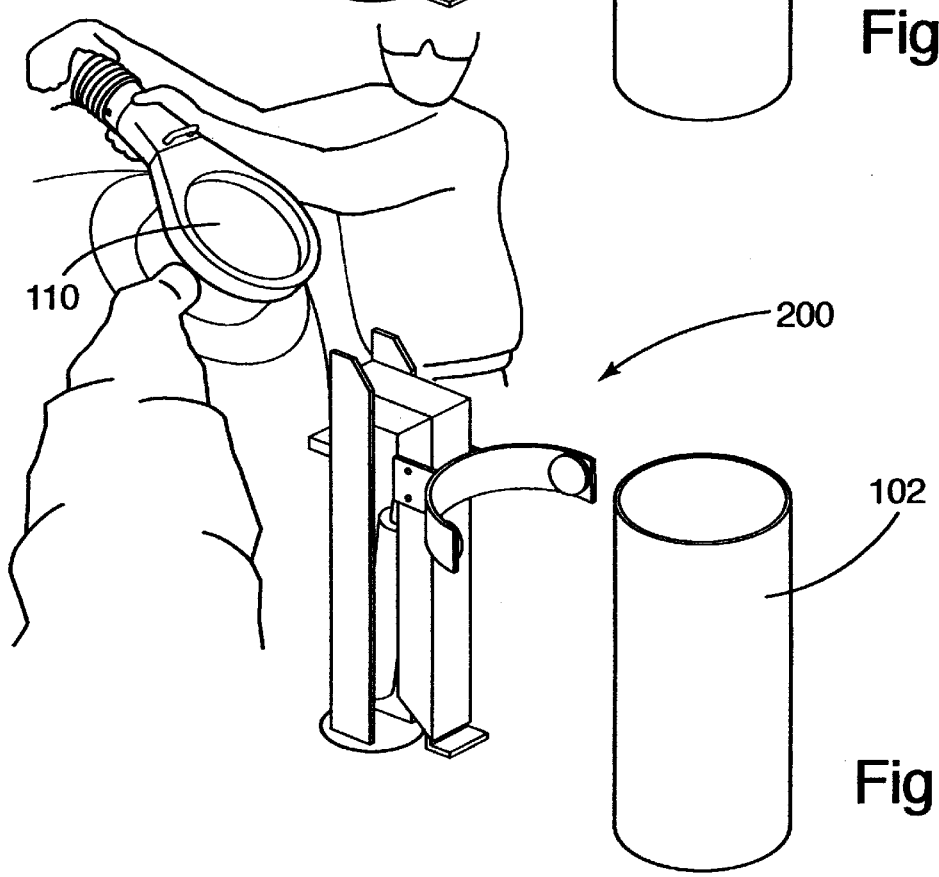
Figure 5C:
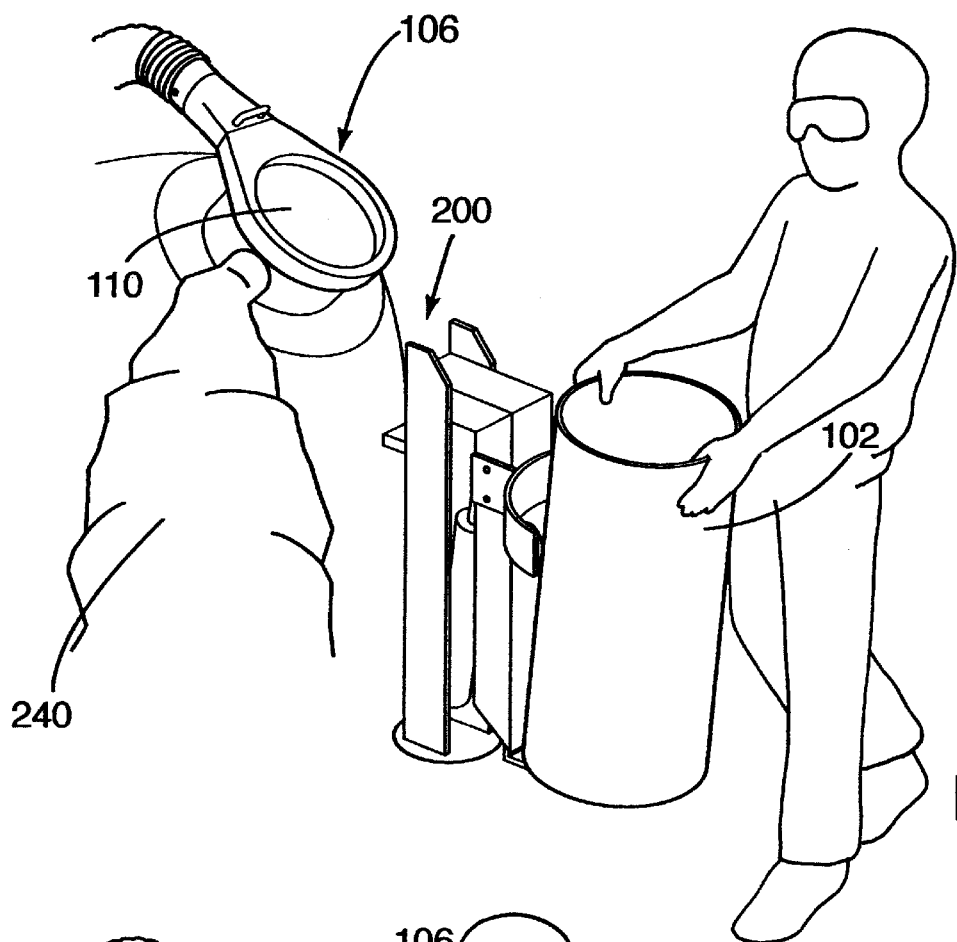

Specifically with respect to drawing FIGS. 5A, 5B, 5C and 6–12, the foregoing description essentially summarizes the contents of these illustrations. Somewhat more specifically, FIG. 5A illustrates the structure and concepts associated with installing the ventilation sleeve 110 into the opening of the reaction vessel 106. FIG. 5B illustrates the concept of attaching the local exhaust and spent drum liner collection bag. FIG. 5C illustrates the concept that the drum 102 may be secured to the drum manipulator 200 within its cradle utilizing suction cups or the like.

Figure 6:
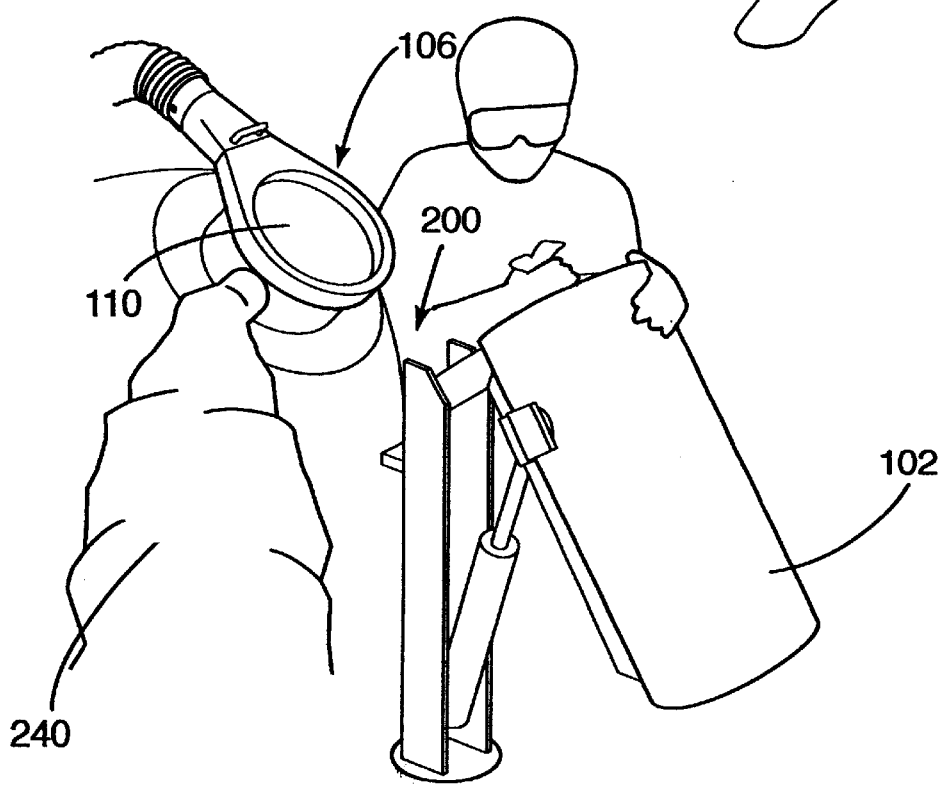
Figure 7:
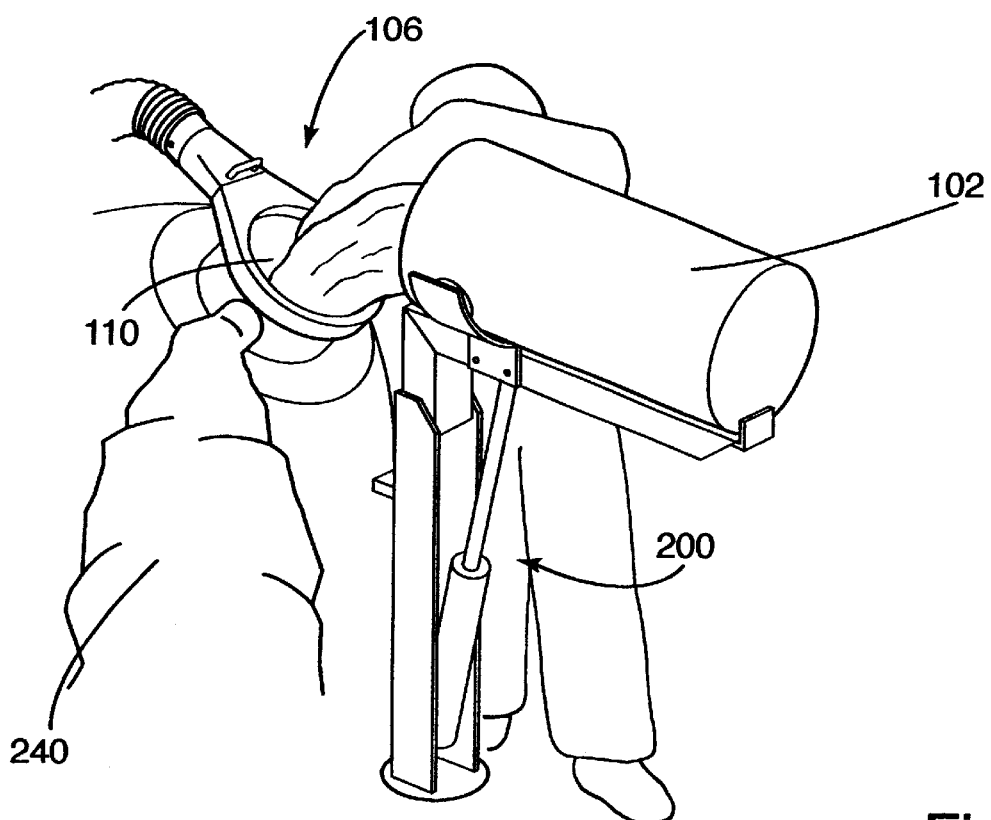
Figure 8:
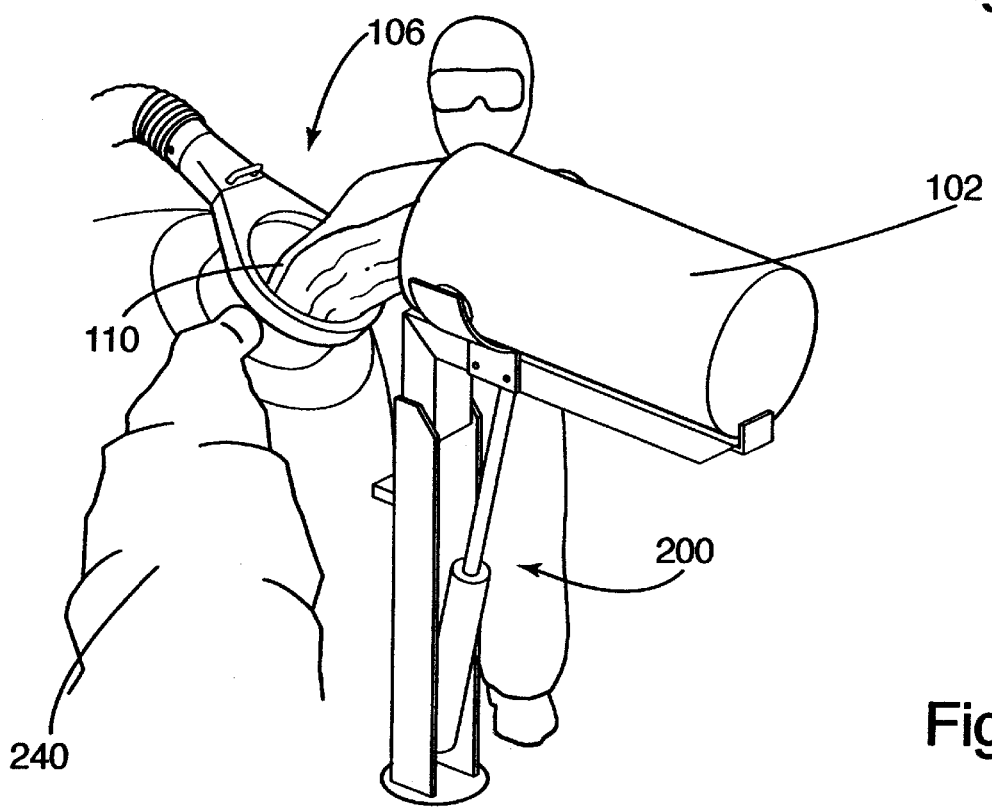
Figure 9:
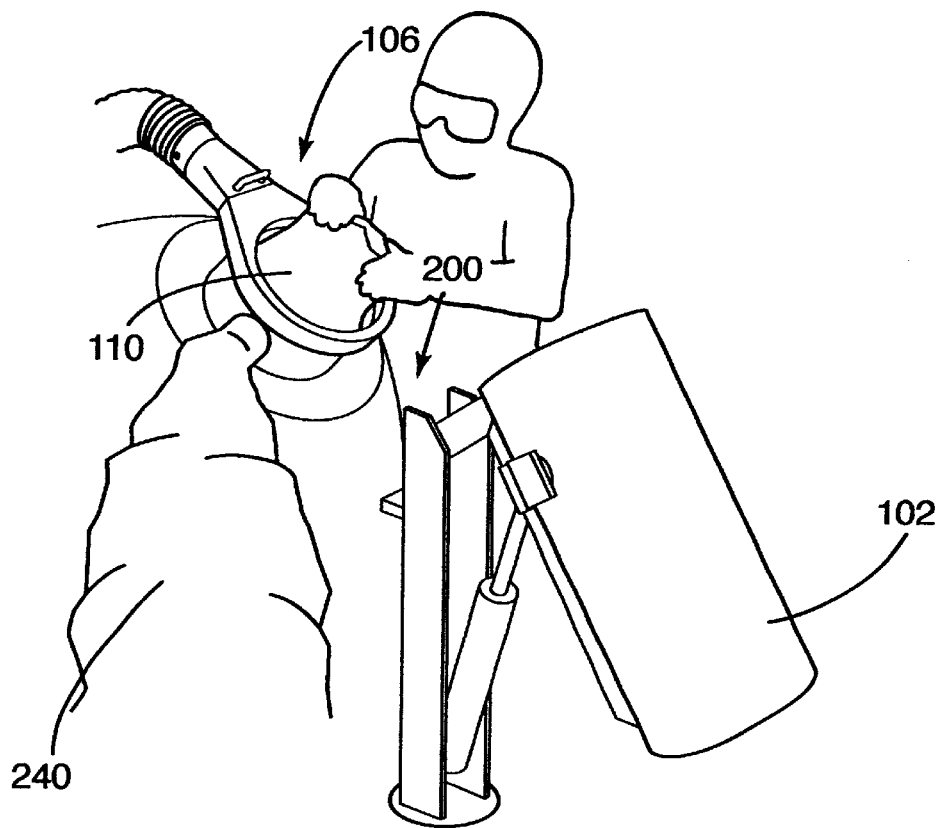
Figure 10:
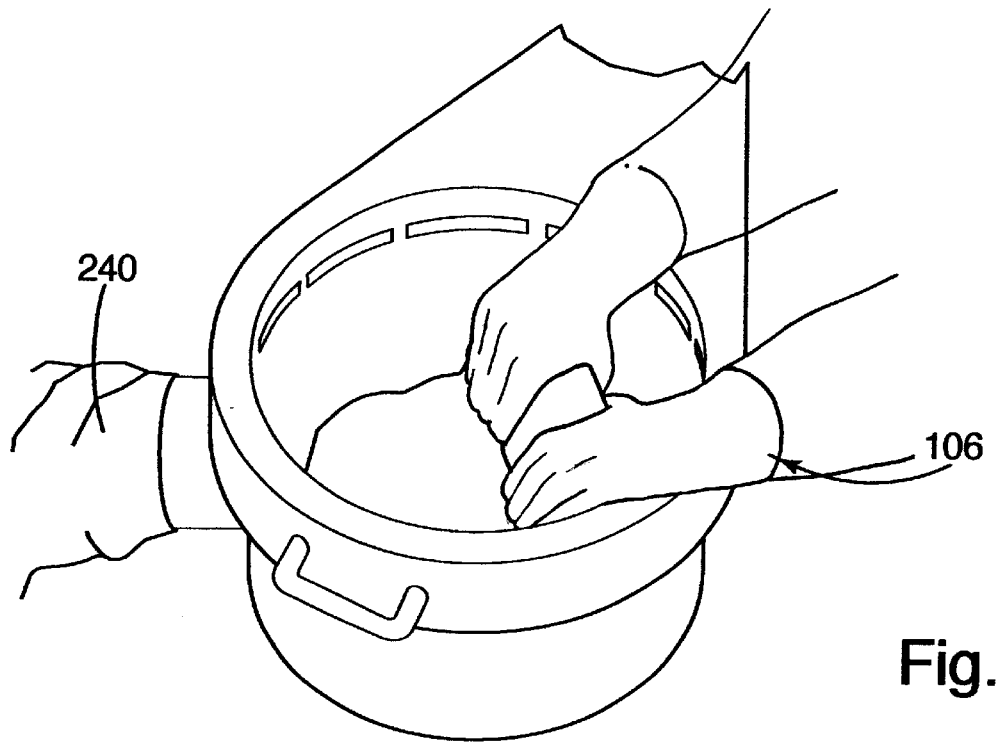
Figure 11:
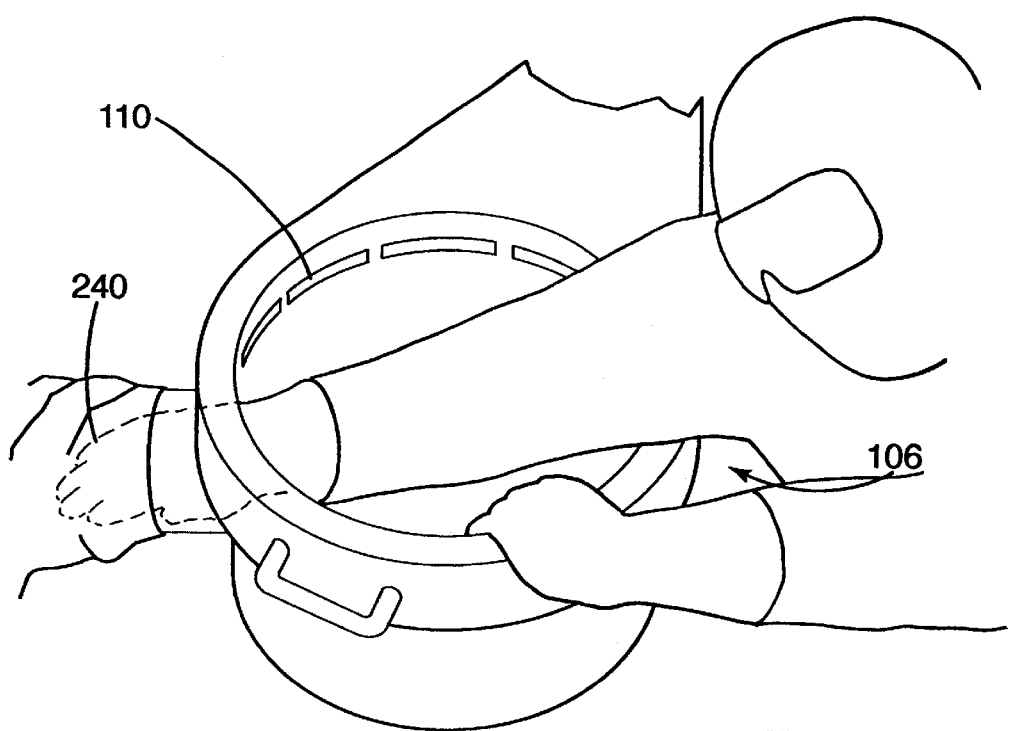
Figure 12:
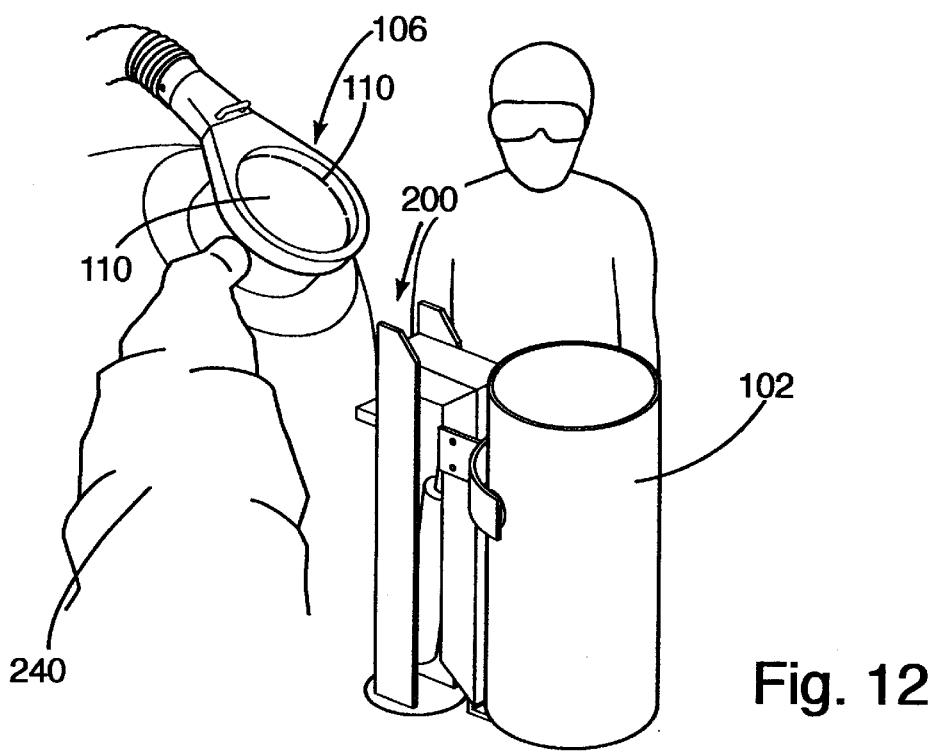

FIG. 6 illustrates the concept that an "up" switch may be utilized to activate the raising of the drum 102 while the user is holding the bag end in a closed configuration. FIG. 7 illustrates the concept that after the drum 102 is raised by the drum manipulator 200, the operator may place the end of the bag into the chute and release. The outlet of the bag is maintained below the exhaust slot. FIG. 8 illustrates the concept that the drum contents may then be placed into the reaction vessel 106. FIG. 9 further illustrates the concept that the drum 102 may then be lowered by the drum manipulator, through the operator activating a "down" switch or the like. The bag is then shaken so as to fully empty the same. FIG. 10 illustrates the concept that the operator may then roll out the empty bag, keeping the opening of the bag below the ventilated slot. Correspondingly, FIG. 11 illustrates the concept that the operator may insert the spent bag through the bag disposal port. FIG. 12 illustrates the concept that the empty drum 102 may then be removed from the cradle of the drum manipulator 200 through activation of a "release" switch.

In accordance with the foregoing, a drum charging system is provided which is portable, while still being releasably mounted in a relatively firm manner during use. The drum charging system in accordance with the invention is also relatively light weight. Of particular importance is the concept that the drum charging system takes up relatively minimal space, particularly with respect to head room. Accordingly, the charging system is particularly adapted for use where relatively little ceiling space is available.

It will be apparent to those skilled in the pertinent art that other embodiments of drum charging systems in accordance with the invention can be designed. That is, the principles of a drum charging system are not limited to the specific embodiments described herein. Accordingly, it will be apparent to those skilled in the art that modifications and other variations of the above described illustrative embodiments of the invention may be effected without departing from the spirit and scope of the novel concepts of the invention.

The embodiments of the invention in which an exclusive property or privilege is claimed are defined as follows:

1. A drum charging system used with a reaction vessel, the drum charging system facilitating lifting and dumping of the contents of drums into the reaction vessel, the drum charging system comprising:

a lift for lifting a drum from a standing position and dumping the contents of the drum;

a loading sleeve fitting into an opening of the reaction vessel into which the drum contents are dumped;

the loading sleeve comprising means for configuration of air flow for ventilation within the loading sleeve, generating an exhaust stream of air around the perimeter of the loading sleeve, in a manner so that the exhaust stream of air flows radially outward from the interior of the loading sleeve in a 360° air flow configuration across a cross-sectional plane of the loading sleeve, thereby preventing dust, which may result in the reaction vessel from the dumping of the drum contents, from escaping upwardly and out of the opening of the reaction vessel; and the drum including at least one drum bag for holding the drum contents, and the loading sleeve further comprising a funnel side port, so that when drum contents are completely dumped from the drum bag, the emptied drum bag can be removed from the drum and inserted through the funnel side port, with the flume side port being positioned below a plane of the movement of the exhaust stream of air within the loading sleeve.

* * * * *

UNITED STATES PATENT AND TRADEMARK OFFICE
CERTIFICATE OF CORRECTION

PATENT NO. : 6,254,330 B1
DATED : July 3, 2001
INVENTOR(S) : Steffen, Nathan D. and Weaver, Neil R.

It is certified that error appears in the above-identified patent and that said Letters Patent is hereby corrected as shown below:

Column 10,
Line 24, please before the word "configuration" please insert -- 360° --;
Line 40, please delete "flume" and substitute therefore -- funnel --.

Signed and Sealed this

First Day of June, 2004

JON W. DUDAS
*Acting Director of the United States Patent and Trademark Office*